(12) United States Patent
Ben Salem et al.

(10) Patent No.: US 12,461,716 B2
(45) Date of Patent: Nov. 4, 2025

(54) PROGRAMMING CODE VULNERABILITY REMEDIATION

(71) Applicant: Accenture Global Solutions Limited, Dublin (IE)

(72) Inventors: Malek Ben Salem, Falls Church, VA (US); Ganesh Devarajan, Hawthorn Woods, IL (US); John Donovan Delmare, Jr., Gainesville, VA (US); Krishna Mohan Dasari, Frisco, TX (US); Mário Lauande Lacroix, Toronto (CA); Cristian Daniel Ariza, Lanus (AR); Mohnish Gahlot, Gurgaon (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 315 days.

(21) Appl. No.: 18/346,386

(22) Filed: Jul. 3, 2023

(65) Prior Publication Data
US 2024/0012623 A1    Jan. 11, 2024

Related U.S. Application Data

(60) Provisional application No. 63/359,289, filed on Jul. 8, 2022.

(30) Foreign Application Priority Data

Jul. 8, 2022 (IN) .............................. 202211039340

(51) Int. Cl.
*G06F 8/30* (2018.01)

(52) U.S. Cl.
CPC ...................................... *G06F 8/30* (2013.01)

(58) Field of Classification Search
CPC ........................................................ G06F 8/30
See application file for complete search history.

(56) References Cited

U.S. PATENT DOCUMENTS

| | | | |
|---|---|---|---|
| 2022/0365777 A1* | 11/2022 | Makmel | G06F 8/73 |
| 2023/0070420 A1* | 3/2023 | Moran | G06F 8/427 |
| 2023/0109730 A1* | 4/2023 | Makmel | G06F 21/577 |
| | | | 717/120 |
| 2023/0315840 A1* | 10/2023 | Cambric | G06F 21/577 |
| | | | 726/23 |

* cited by examiner

*Primary Examiner* — Phillip H Nguyen
(74) *Attorney, Agent, or Firm* — Mannava & Kang, P.C.

(57) ABSTRACT

A code remediation system accesses a programming code including vulnerabilities such as potential secrets and remediates at least a subset of the potential secrets to generate modified programming code wherein the subset of potential secrets which are determined to be actual secrets are replaced with access mechanisms to storage locations on a vault wherein the actual secrets are secured. To identify the subset of potential secrets forming the actual secrets to be remediated, the code remediation system is configured to filter out false positives among the potential secrets and identify true positives. When an application executing the modified code encounters an access mechanism, it accesses the vault to retrieve the actual secrets.

20 Claims, 7 Drawing Sheets

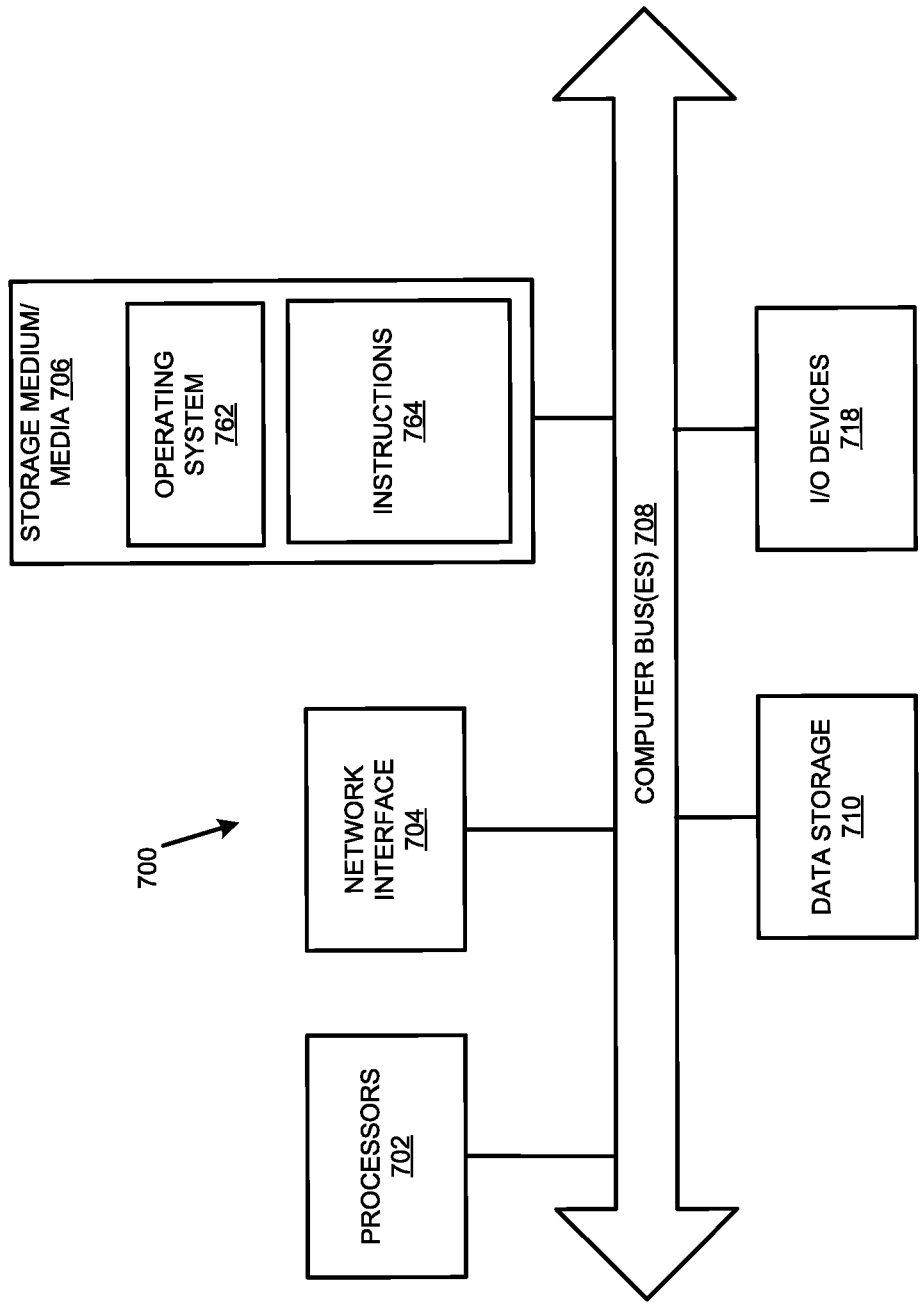

PROGRAMMING CODE VULNERABILITY REMEDIATION

PRIORITY

The present application claims priority under 35 U.S.C. 119(a)-(e) to the Indian Provisional Patent Application Serial No. 202211039340, having a filing date of Jul. 8, 2022, and the U.S. Provisional Patent Application Ser. No. 63/359,289 filed on Jul. 8, 2022, the disclosures of which are hereby incorporated by reference in their entireties.

BACKGROUND

A secret in a programming code generally includes information that a user of the programming code desires to keep confidential so that such information is prevented from becoming public knowledge. Examples of secrets may include authenticating credentials such as usernames, passwords, personal identification numbers (PINs), Application Programming Interfaces (API) keys, authentication tokens, private encryption keys, digital certificates, biometric data, etc. Thus, secrets may include different data types, such as text, numeric, alphanumeric, image data, audio/video data, or any other data type. Cloud-based development has changed the security model. Secrets of different types may be included in programming code used in multiple environments, from staging to production (e.g., source code, configuration files, Infra-as-Code, test code, documentation, package management files, scripts, and project files). Developers now have access to entire applications and production environments, making the compromise of their identities a threat with a potentially serious impact. Hence, such a compromise must be prevented by ensuring the security of developers' passwords, access keys, and other secrets or confidential data.

BRIEF DESCRIPTION OF DRAWINGS

Features of the present disclosure are illustrated by way of examples shown in the following figures. In the following figures, like numerals indicate like elements, in which:

FIG. 7 illustrates a computer system that may be used to implement the programming code remediation system in accordance with the examples disclosed herein.

DETAILED DESCRIPTION

Figure 1:
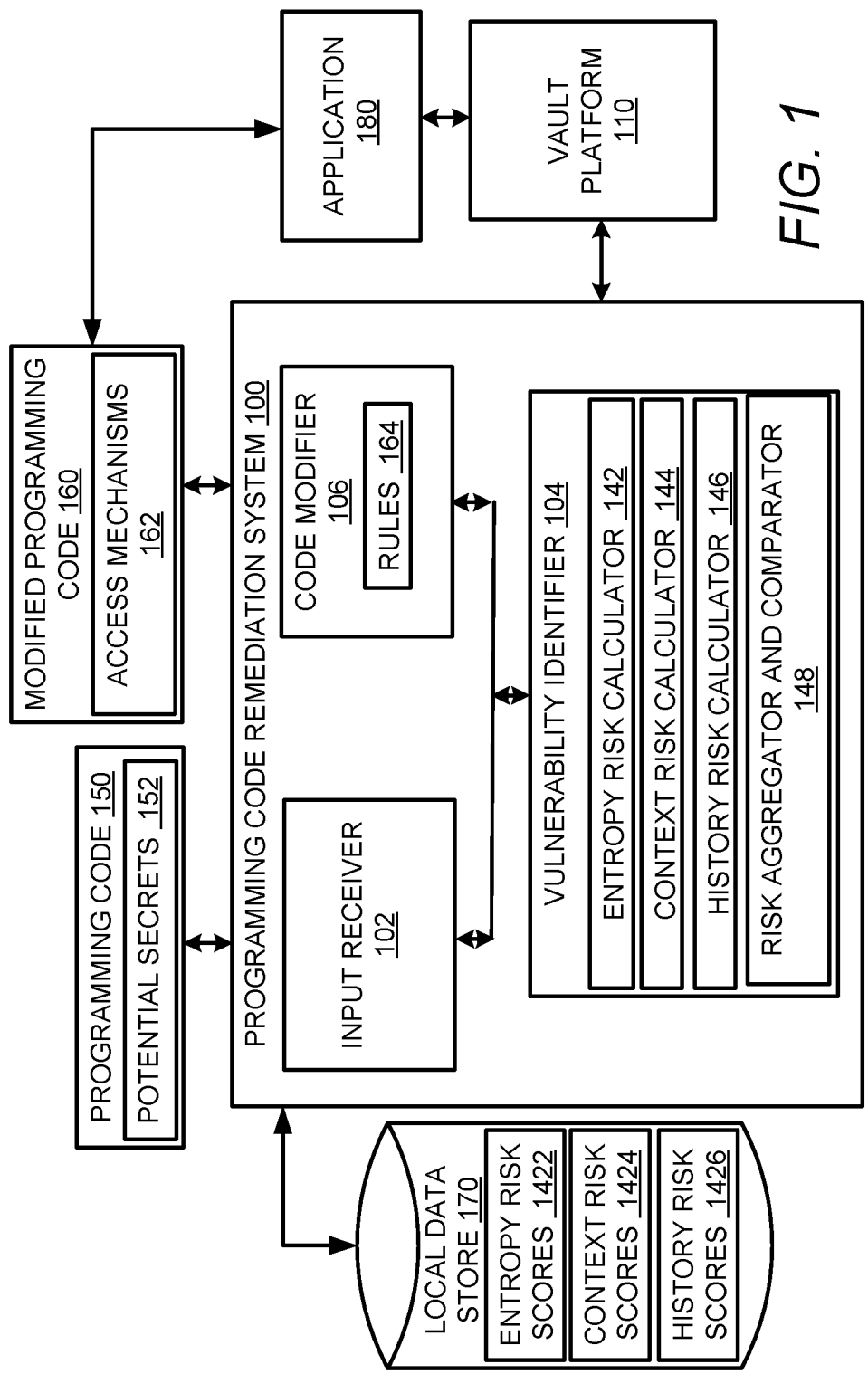
FIG. 1 shows a diagram of a programming code remediation system in accordance with the examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" mean including but not limited to. The term "based on" means based at least in part on.

1. Overview

Secrets such as authentication data may be deemed as code vulnerabilities when hard-coded into programming code as they can be used by unethical actors for unauthorized access to computer systems to carry out illegal/harmful operations. While various programming environments can be scanned for secrets, the challenge is not to overwhelm developers and security analysts with false positives and to remediate these vulnerabilities without compromising the functionality of the application. The aforementioned problem is addressed by the programming code remediation system disclosed herein. The system takes as input a list of vulnerabilities including potential secrets obtained from data scanning/extraction tools which are configured to identify specific types of data as secrets. For example, these tools find exposed secrets in code by looking for specific field names like "password", "token", or "API_Key", etc. They may also search for commonly used passwords such as birthdays, first/last names, places, or randomly generated strings of specific lengths. However, not all occurrences of such data within the programming code need to be secrets. Some strings such as first/last names, random numbers, names of places, etc., may be hard-coded for certain programming operations. When such occurrences of data elements are erroneously identified by the data scanning tools as secrets it can lead to a higher rate of false positives in secrets identification.

The programming code remediation system disclosed herein uses various techniques to identify and filter false positives in identifying secrets in programming code. In an example, the system can assign a risk score to each identified secret and if the risk score is below a certain predetermined risk threshold, the vulnerability is filtered as a false positive. The risk score is computed using three different metrics, (1) an entropy risk score, (2) a context/environment risk coefficient, and (3) a history risk score. A final risk score may be obtained from the three different metrics which can be compared to the predetermined risk threshold. The different pieces of data having final risk scores greater than the predetermined risk scores are confirmed as secrets or code vulnerabilities which are to be remediated or removed from the programming code by the system which secures such data so that they are accessible only to authorized parties but cannot be accessed by unauthorized/illegal users.

A final risk score of a piece of data can be compared to the predetermined risk threshold in order to be identified as a secret to be remediated by the system by storing it in a vault platform. In an example, the secret may be hashed when stored in the vault and an access mechanism such as a Universal Resource Locator (URL) is generated corresponding to the hashed secret. A vault is deployed to provide a known and consistent identity-based secrets and encryption management system within the client's environment for all applications. The vault provides encryption services that are gated by authentication and authorization methods. Using the vault's User Interface (UI), Command Line Interface (CLI), or Hyper Text Transfer Protocol (HTTP) API, access to secrets and other sensitive data can be managed, tightly controlled (restricted), and audited. Access to the vault enables automatic remediation of secrets found in the source code, infra-as-code, configuration files, etc. The APIs exposed by the open-source vault are used to set/extract passwords/keys from the vault. The vulnerable source code that uses the hard-coded keys/passwords/tokens/ is replaced with modified programming source code that interfaces with the vault to read the right key. The secret in the programming code is replaced by the system with the corresponding URL thereby generating modified programming code. In an example, additional information/data elements may be associated with the URLs based on the type of application being remediated. For example, a timer function may be associated with a URL in the modified code corresponding to credentials for access to a database so that the connection to the database remains open for a predetermined time period without having to repeatedly access the vault to retrieve authentication data while conducting transactions with the database. Modified programming code, therefore, includes original programming code with true positive secrets being replaced by URLs corresponding to the storage locations on the vault wherein such secrets are stored. The vulnerabilities in the original programming code are thus remediated by the system which hides any secrets detected therein. Furthermore, the code remediation system described herein is agnostic to any other key management systems and therefore works for various programming languages and applications. Remediations can be generated programmatically to produce modified code that does not expose any secrets.

2. System Architecture

FIG. 1 shows a diagram of a programming code remediation system 100 in accordance with the examples disclosed herein. The system 100 receives programming code 150 with vulnerabilities and remediates the vulnerabilities in the programming code 150. In an example, the vulnerabilities may include potential secrets 152 and the system 100 remediates the programming code 150 by securing the potential secrets 152 in a vault platform 110. Secured access is provided for the secrets thus stored so that only authorized entities can access the stored secrets. Different types of secrets can be included in the programming code 150 and may be stored in different areas on the vault platform 110 to be accessed by entities such as the application 180 executing the programming code 150. The system 100 includes an input receiver 102, a vulnerability identifier 104, and a code modifier 106. The input receiver 102 receives or accesses the programming code 150 with the potential secrets 152. In an example, the potential secrets 152 may include user names, passwords, key-value pairs, random strings, etc., that are hard-coded into the programming code 150. The potential secrets 152 may be identified by the code analysis tools (not shown) and provided as input to the system 100. The system 100 may include or may be communicatively coupled to a local data store 170 to store the potential secrets 152, copies of the programming code 150, or other data that is generated and/or used by the system 100 during its operation.

Although the potential secrets 152 may be identified and provided as input to the system 100 by the code analysis tools, such identification may lead to false positives so that portions of code that do not include secrets are identified as including secrets. Therefore, the system 100 includes the vulnerability identifier 104 enabled for differentiating the false positives from the true positives in the potential secrets 152. The vulnerability identifier 104 simplifies the code remediation process by filtering out the false positives in the potential secrets 152 identified in the programming code 150. The vulnerabilities identifier 104 includes an entropy risk calculator 142, a context risk calculator 144, and a history risk calculator 146. The entropy risk calculator 142 calculates an entropy risk scores 1422 for each of the potential secrets 152. Entropy is indicative of randomness and the higher the randomness within a given piece of textual content greater will be the entropy. A secret in the programming code tends to be randomized as compared to the surrounding text. For example, recommendations for setting passwords require them to be random. Different entropy-measuring algorithms may be used to measure randomness in secrets that may indicate a key or a password and compute the entropy risk score associated with the identified potential secret. Hence, the actual secrets can be identified from the set of potential secrets 152 by higher values of the entropy risk score 1422. The entropy risk scores 1422 are estimated for each of the potential secretes 152 with respect to certain target populations. The target populations that are considered can include the programming language (e.g. Java, C #), and the language in which the code comments are written (e.g., English, Spanish, German, etc.). Additionally, the more standardized entropy measures such as Shannon's entropy and the Guessing Entropy as defined by the National Institute of Standards and Technology (NIST) may also be used.

Context risk scores 1424 are also calculated for potential secrets. A context risk score is calculated based on a context associated with the potential secret. It also uses the context of the code to assign the environment risk coefficient. Various application-specific factors can make up the context risk score which may be an aggregate of the different factors. For example, if the application 160 is a production system then the context risk scores 1424 for secrets used in a production system can be higher than context risk scores for secrets wherein the application 160 is a staging environment due to the impact of the secret exfiltration in that environment. An application with a high business impact can be given a higher context risk score than an application with a low business impact. In an example, the application risk rating algorithm of IBM Authorized Software Assessment Management Provider (IASP) platform can add more context to the context risk score calculation. The context may also include but is not limited to, the type of secret e.g., passwords, directory secret, Lightweight Directory Access Protocol (LDAP), etc. Thus, various application risk rating algorithms based on different criteria can be used to add more context to the context risk score which may be computed as an aggregate or a weighted aggregate of the various contextual factors.

Thirdly, a history risk score or a history risk coefficient is also obtained based on a determination that a potential secret was previously identified as a false positive. Then, subsequent occurrences of that potential secret in the programming code 150 may also be automatically filtered out as not being a secret. If potential secrets have been previously marked as false positives in previous scans, then such potential secrets are no longer treated as secrets and are filtered out in the current scan as false positives that require no further processing, therefore, saving developers significant remediation and testing time. Accordingly, the system 100 can be configured to treat secrets based on history risk scores in different ways. In one example, the system 100 may calculate the history risk scores to be proportional to the number of prior false positive occurrences for a given secret so that a higher history risk score is indicative of a false positive. Alternately, the system 100 can also be configured to assign a maximum history risk score for a given potential secret and each occurrence of a prior false positive identification lowers the assigned risk score so that if the history risk score goes below a predetermined value, the potential secret is filtered out a false positive.

The vulnerability identifier 104 also includes a risk aggregator and comparator 148 which aggregates the various risk scores for each of the potential secrets 154 to generate a final risk score and compares the final risk score with a predetermined risk threshold. Based on the comparison with the risk threshold, a potential secret may be identified as a true positive or a false positive. The risk aggregator and comparator 148 can employ Receiver Operating Characteristics (ROC) for differentiating the false positives from true positives. Again, the risk threshold for a potential secret may depend on the type of secret so different types of secrets may have different risk thresholds for false positive filtration. In an example, if the potential secret is determined to be a true positive, the information regarding the potential secret can be provided to the code modifier 106 for the remediation of the secret.

Upon receiving the information regarding a true positive secret, the code modifier 106 identifies a location in the vault platform 110 and moves the secret from the programming code 150 to be stored in the location of the vault platform 110. In an example, the secret may be hashed when stored in the vault platform 110. An access mechanism such as a Universal Resource Locator (URL) is generated corresponding to the hashed secret. The code modifier 106 replaces the secret in the programming code 150 with the corresponding URL. Similarly, the code modifier 106 remediates other true positive secrets in the programming code 150 by replacing the true positive secrets with the access mechanisms 162 to generate modified programming code 160. The access mechanisms 162, e.g., URLs may also include access parameters and tokens that allow authenticated entities such as the application 180 to access the secrets stored in the vault platform 110. At run time, the application 180 executes the modified programming code 160 and accesses the secrets from the vault platform 110 each time one of the Access mechanisms 162 is encountered.

Figure 2:
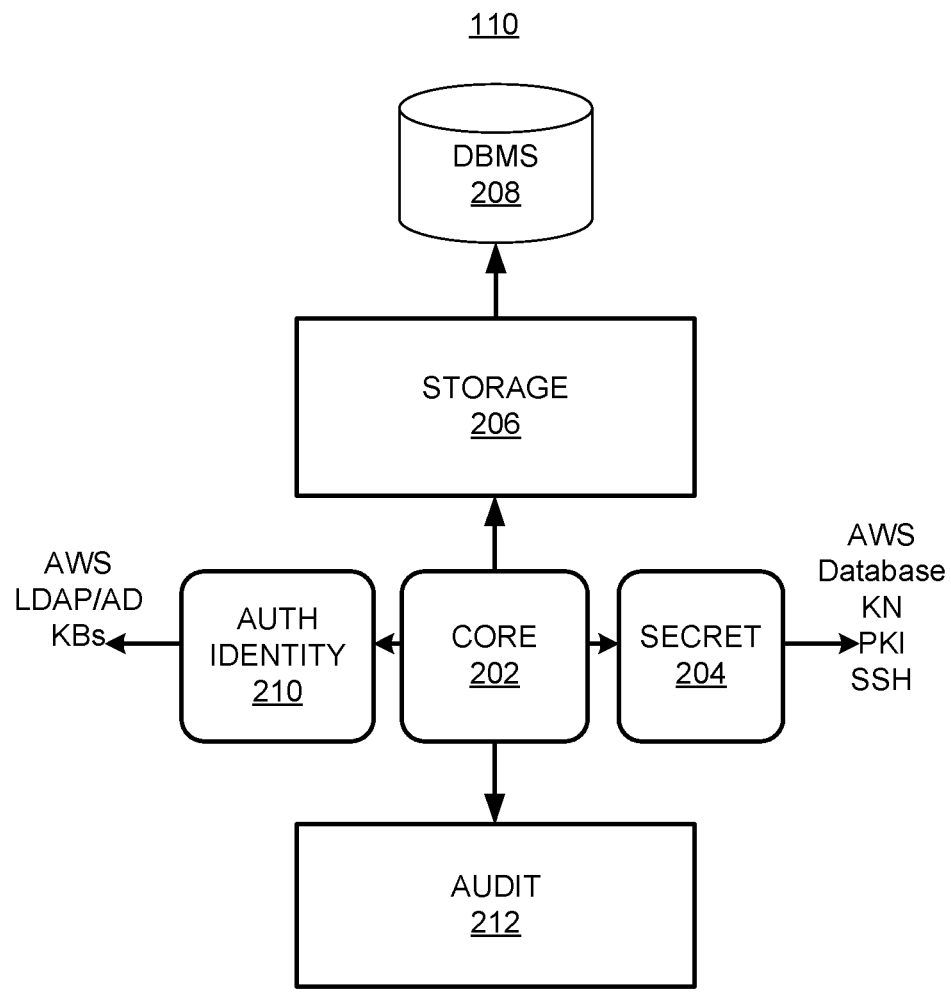
FIG. 2 shows a diagram of a vault platform in accordance with the examples disclosed herein.

The modified programming code 160 is generated in a rule-based process from the programming code 150. Accordingly, the code modifier 106 can be configured with rules 164 which can include, for example, regular expressions that enable the generation of the modified programming code 160. Different applications or code in different programming languages may warrant different access mechanisms for the generation of the modified programming code 160. For example, if the application 180 is a database application, a timer can be included with one or more of the access mechanisms 162 in the modified programming code 160 so that once a connection between the application 180 and a database is opened, it stays open for a predetermined time period allowing for completion of the various database operations without the necessity to access the credentials multiple times from the vault platform 110 during the execution of the database operations. FIG. 2 shows a diagram of the vault platform 110 in accordance with the examples disclosed herein. It may be noted that the diagram and the below description of the vault platform are provided for illustration purposes only and that other vault platforms may be employed in accordance with the examples disclosed herein. The vault platform 110 is deployed as part of the solution to provide a known and consistent identity-based secrets and encryption management system for various applications. The vault platform 110 provides encryption services that are gated by authentication and authorization methods. Using the vault's User Interface (UI), CLI, or Hypertext Transfer Protocol (HTTP) Application Programming Interfaces (API), access to secrets and other sensitive data can be managed, tightly controlled (restricted), and audited.

In an example, the vault platform 110 may be configured on token-based architecture to enable the dynamic injection of secrets. The access mechanisms 162 may be stored and retrieved via the Post' and 'Get' methods. The policies to be enforced for the secrets are applied by the vaults so that the parameters in the access mechanisms 162 may be employed using, for example, the 'Get' method by the application 180. More particularly, different types of secrets may be stored in different locations of the vault platform 110 where the corresponding policies may be applied. The vault platform 110 includes a core 202 which receives different types of secrets 204 such as secrets that will be included for SSH communications, or encrypted communications e.g., a key used for PKI of a database, etc. These secrets are stored in storage 206 or in a database management system 208 which may include a relational database management system (RDBMS), CONSL®, SPANNER® etc. The secrets thus stored can be retrieved upon authenticating the identities 210. The information stored in the vault platform 110 may also be audited 212, e.g., to identify the applications accessing the secrets, the metadata associated with such attempts to access, etc.

3. Flowcharts

Figure 3:
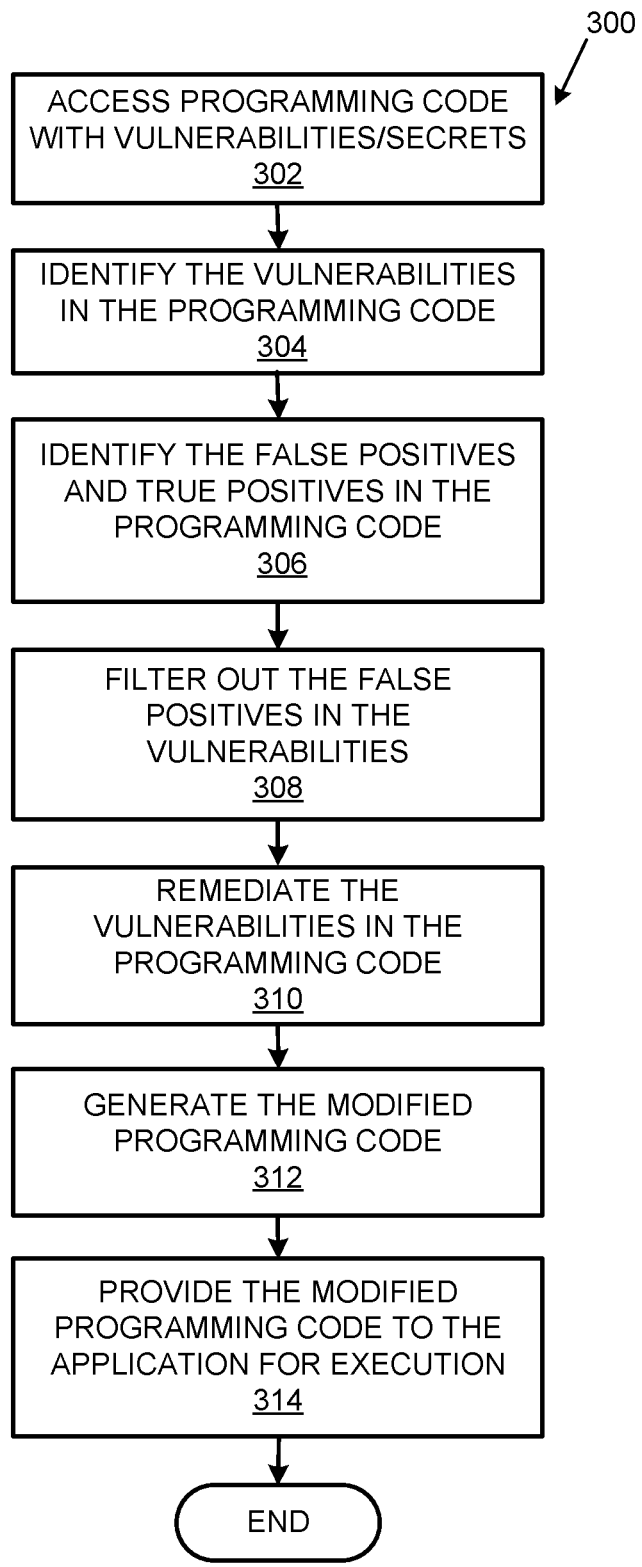
FIG. 3 shows a flowchart that illustrates a process of code remediation in accordance with the examples disclosed herein.

FIG. 3 shows a flowchart 300 that illustrates a process of code remediation in accordance with the examples disclosed herein. The method begins at 302 wherein the programming code 150 with the potential secrets 152 or vulnerabilities is received by the system 100. The vulnerabilities e.g., the potential secrets 152 are identified from the programming code 150 by the system 100 at 304. In an example, the programming code 150 can be processed by a secret detection scanning software tool and the information regarding the vulnerabilities or the potential secrets 152 identified by the code scanning tool can be directly accessed by the system 100. However, all the potential secrets identified by the code-scanning tool are not necessarily actual secrets that need to be kept confidential. Some of the potential secrets identified by the code-scanning software may include false positives. Therefore, the false positives and the true positives in the potential secrets 152 are identified at 306. The false positives are filtered out from further processing at 308 so that the false positives are treated as normal code elements and not as secrets or vulnerabilities to be remediated. Those vulnerabilities or potential secrets in the programming code 150 which are determined to be true positives can be remediated at 310. Code remediation includes rendering code vulnerabilities i.e., true positives among the potential secrets 152 invulnerable to hacking or other unauthorized access. Modified programming code 160 is generated at 312 upon the remediation of code vulnerabilities. The modified programming code can be provided to the application 180 at 314 for execution.

Figure 4:
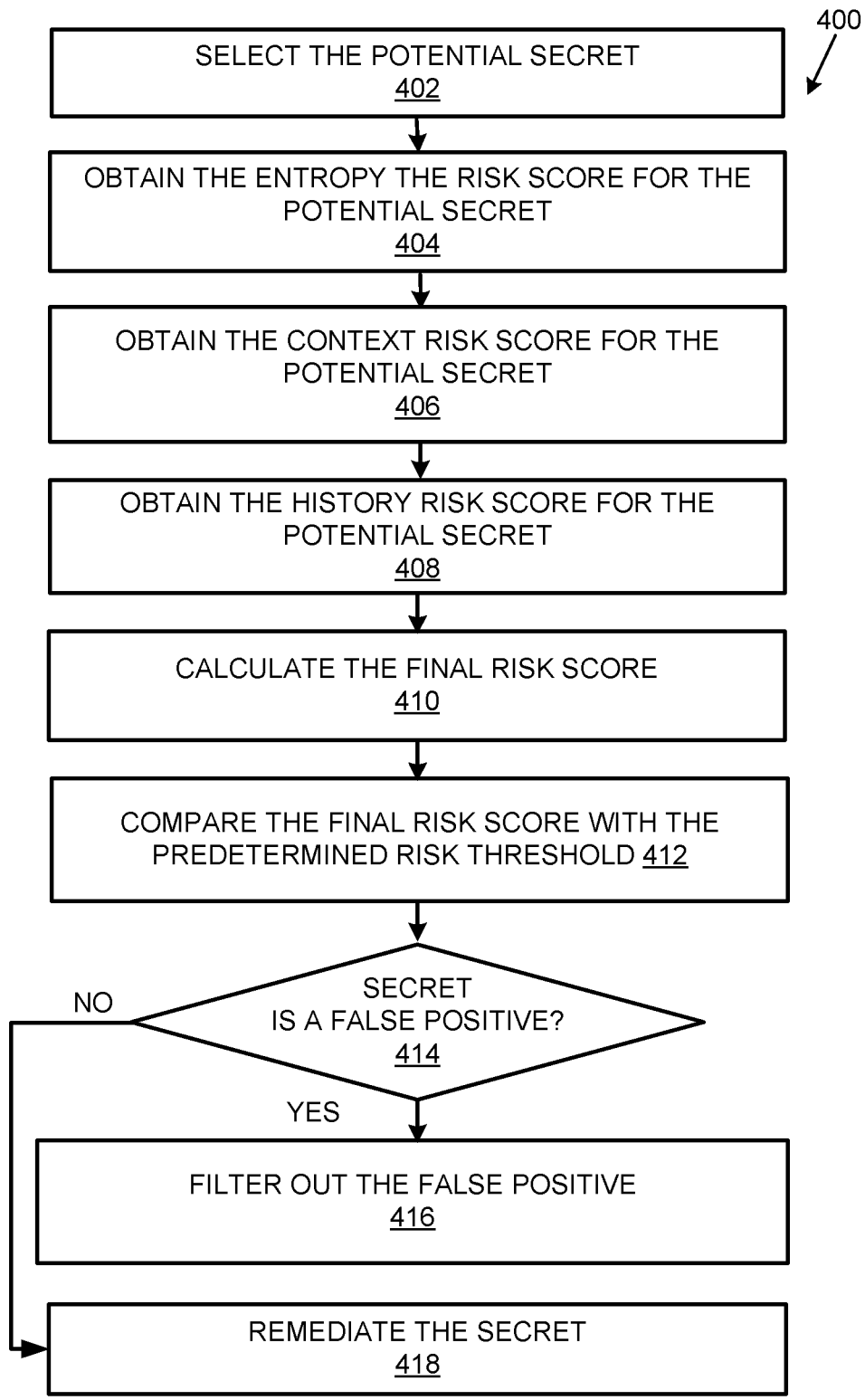
FIG. 4 shows a flowchart that details a method of filtering false positives in accordance with the examples disclosed herein.

FIG. 4 shows a flowchart 400 of a method for filtering false positives in accordance with the examples disclosed herein. False positives are identified based on a comparison of the final risk score with a predetermined risk threshold. One or more of the potential secrets 152 with final risk scores that do not meet the predetermined risk threshold can be disregarded as false positives. Meeting the predetermined risk threshold may involve the final risk scores exceeding or falling below the predetermined risk threshold depending on the configuration of the predetermined risk threshold. The predetermined threshold can be determined and updated on an empirical basis. In an example, ROC can be employed to distinguish the false positives from the true positives.

The method begins with 402 wherein one of the potential secrets 152 is selected in the programming code 150. At 404, the entropy risk score is obtained for the selected potential secret. At 406, the context risk score is obtained for the selected potential secret. The history risk score is obtained at 408 for the selected potential secret. In an example, the history risk score can include a history coefficient that is obtained by comparing a current secret detection scan report of the programming code 150 with one or more previous secret detection scan reports of earlier versions or a current version of the programming code 150. One or more of the potential secrets 152 in the current secret detection scan report that were marked as false positives in at least one of the previous secret detection scan reports are identified. One or more of the potential secrets 152 in the current secret detection scan report that were marked as false positives in at least one of the previous secret detection scan reports are also filtered out as false positives in generating the modified programming code 160. In an example, the context of the occurrence of a false positive in the programming code 150 in a previous secret detection scan report and the current secret detection scan report may be compared and the false positive may be determined if the contexts are similar, else the potential secret may be marked as a true positive.

The aggregate or final risk score is calculated at 410 from the entropy risk score, the context risk score, and optionally the history risk score for the potential secret. In an example, the final risk score can be an aggregate, a weighted aggregate, an average, or a weighted average of the different scores. When the history coefficient is used, it may be initially applied to filter out the false positives and the remaining potential secrets are filtered using combinations of the entropy risk scores and the context risk scores. The final risk score of the selected potential secret is compared with a predetermined threshold at 412. If it is determined at 414 that the selected secret is a false positive, it is filtered out or disregarded from further processing at 416. If it is determined at 414 that the selected secret is not a false positive, then the selected secret is treated as a true positive and remediated at 418. Similarly, each of the potential secrets 152 can be analyzed to differentiate the true positives from the false positives.

Figure 5:
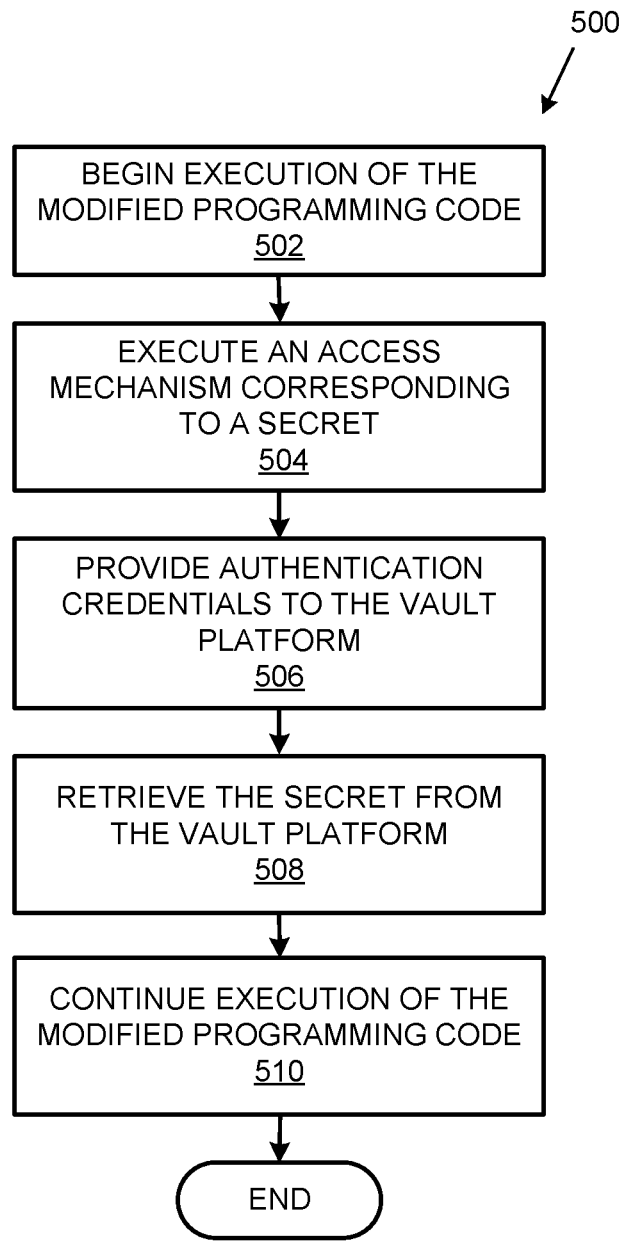
FIG. 5 shows a flowchart that details a method of application execution in accordance with the examples disclosed herein.

FIG. 5 shows a flowchart 500 that details a method of application execution in accordance with the examples disclosed herein. The method begins with the application accessing modified programming code 160. At 502, the application 180 begins execution of the modified programming code 160. At 504, an access mechanism such as a URL corresponding to a secret is accessed during the execution. The authentication credentials included for example, in the URL parameters for accessing the secret are provided to the vault platform 110 or more particularly to a storage area of the vault platform 110 at 506. The secret is retrieved upon authentication of the application 180 at 508 and the application 180 continues execution at 510 until the next access mechanism corresponding to another secret is encountered whereupon, the process described above is repeated. It may be noted that the secrets retrieved by the application 108 would include only the true positive secrets obtained upon filtering out the false positives from the potential secrets 152 included in the programming code 150. In an example, the secret may include authentication credentials used by the application 180 to access another application. For example, the application 180 may connect to a database using the authentication credentials. In this case, the authentication credentials may be valid for a time period based on a parameter of the URL used to access the secret so that the application 180 is mitigated from the need to keep accessing the vault platform 110 when executing operations on the database. Thus, the access mechanisms 162 may include similar parameters or other data elements depending on the usage of the secret by the application 180.

Figure 6:
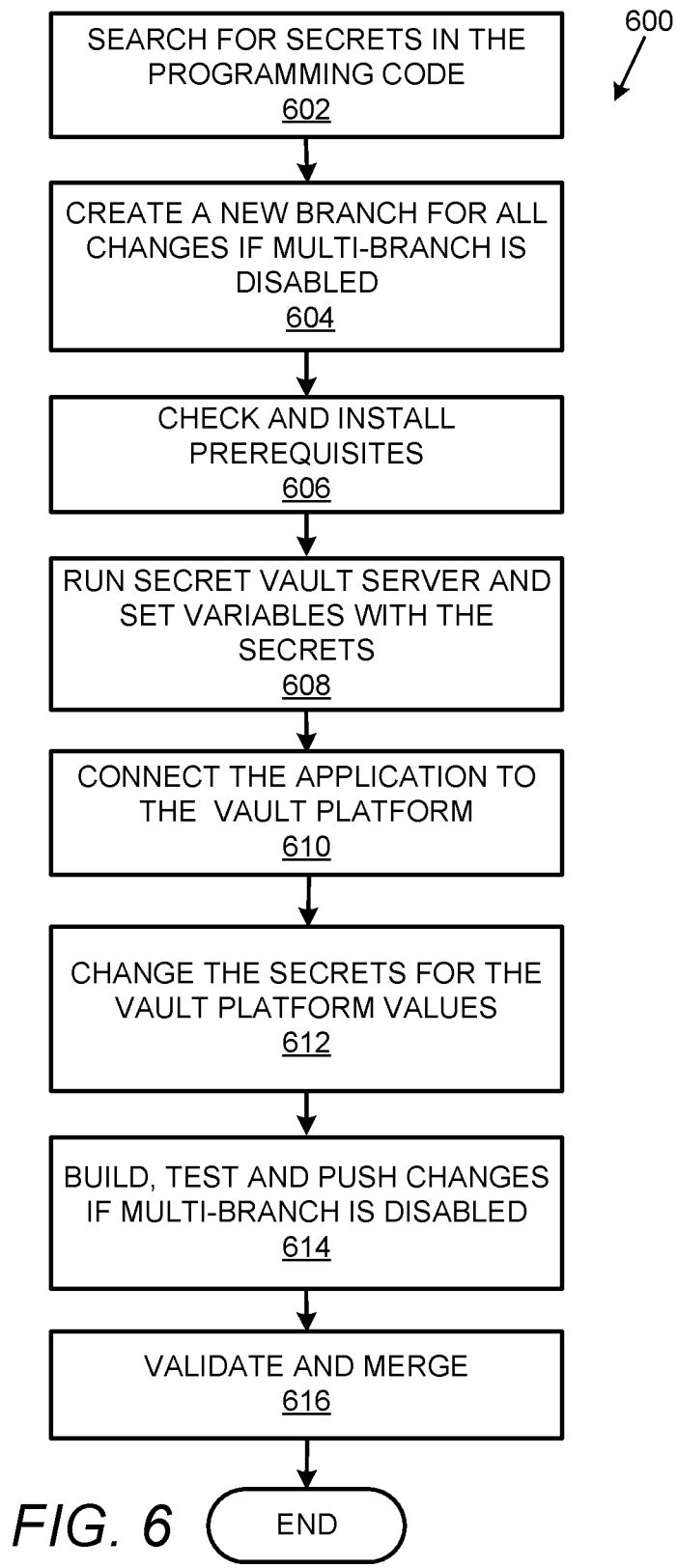
FIG. 6 shows a flowchart that details a vault remediation process in accordance with the examples disclosed herein.

FIG. 6 shows a flowchart 600 that details a vault remediation process in accordance with the examples disclosed herein. At 602, code scanning tools such as but not limited to Veracode/Fortify scan the programming code 150 for vulnerabilities such as hardcoded credentials/secrets. On detecting vulnerabilities, the method proceeds with remediating the programming code 150 to generate the modified programming code 160 where the secrets are protected from unauthorized access. At 604, a new branch is created for all the changes if the multi-branch is disabled. At 606, the prerequisites are checked and installed. For example, an open-source vault platform such as HashiCop® Secret Vault server may be installed. It's a secret vault used for managing secrets and protecting sensitive data this can be installed with Chocolatey®. At 608, the secret vault server is executed with the variables set to the secrets. The role of this secret vault server is to host the key values for the application 180. A connection is made from the application to the vault platform 110 at 610. The values from the running Secret Vault can be obtained by opening a new command line to set the credentials. At 612, the secrets are changed to the vault platform values. The secrets are set up with the corresponding values which may be retrieved using the code scanning tools such as Veracode/Fortify, etc. The path in this case is application specific and can be changed. At 614, the changes are built, tested, and pushed to the repo if successfully built and if the multi-branch is disabled. The system is checked and validated at 616 if functioning smoothly.

4. System Diagram

FIG. 7 illustrates a computer system 700 that may be used to implement the code remediation system 100. More particularly, computing machines such as desktops, laptops, smartphones, tablets, and wearables which may be used to generate or access the data from the code remediation system 100 may have the structure of the computer system 700. The computer system 700 may include additional components not shown and that some of the process components described may be removed and/or modified. In another example, a computer system 700 can sit on external-cloud platforms such as Amazon Web Services, AZURE® cloud or internal corporate cloud computing clusters, or organizational computing resources, etc.

The computer system 700 includes processor(s) 702, such as a central processing unit, ASIC or another type of processing circuit, input/output devices 718, such as a display, mouse keyboard, etc., a network interface 704, such as a Local Area Network (LAN), a wireless 802.11x LAN, a 3G, 4G or 5G mobile WAN or a WiMax WAN, and a processor-readable medium 706. Each of these components may be operatively coupled to a bus 708. The computerreadable medium 706 may be any suitable medium that participates in providing instructions to the processor(s) 702 for execution. For example, the processor-readable medium 706 may be a non-transitory or non-volatile medium, such as a magnetic disk or solid-state non-volatile memory, or a volatile medium such as RAM. The instructions or modules stored on the processor-readable medium 706 may include machine-readable instructions 764 executed by the processor(s) 702 that cause the processor(s) 702 to perform the methods and functions of the code remediation system 100.

The code remediation system 100 may be implemented as software stored on a non-transitory processor-readable medium and executed by the one or more processors 702. For example, the processor-readable medium 706 may store an operating system 762, such as MAC OS, MS WINDOWS, UNIX, or LINUX, and code 764 for the code remediation system 100. The operating system 762 may be multi-user, multiprocessing, multitasking, multithreading, real-time, and the like. For example, during runtime, the operating system 762 is running and the code for the code remediation system 100 is executed by the processor(s) 702.

The computer system 700 may include a data storage 710, which may include non-volatile data storage. The data storage 710 stores any data used by the code remediation system 100. The data storage 710 may be used to store the various risk scores, predetermined risk threshold(s), and other data that is used or generated by the code remediation system 100 during the course of operation.

The network interface 704 connects the computer system 700 to internal systems for example, via a LAN. Also, the network interface 704 may connect the computer system 700 to the Internet. For example, computer system 700 may connect to web browsers and other external applications and systems via the network interface 704.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

What is claimed is:

1. A programming code remediation system, comprising:
at least one processor;
a non-transitory processor-readable medium storing machine-readable instructions that cause the at least one processor to:
access programming code of an application and information regarding potential secrets included in the programming code;
calculate a final risk score for each of the potential secrets, wherein the final risk score is indicative of a corresponding potential secret being a false positive or a true positive;
identify the false positives and the true positives from the potential secrets based at least on the final risk scores of the potential secrets;
filter out the false positives of the potential secrets from further processing;
store a subset of the potential secrets determined to be the true positives in corresponding storage locations of a vault; and
generate modified programming code by replacing the true positives in the programming code with corresponding access mechanisms to the storage locations on the vault storing the true positives.

2. The code remediation system of claim 1 wherein the at least one processor executes further instructions to:
provide the modified programming code for execution to the application.

3. The code remediation system of claim 1, wherein to calculate the final risk score, the at least one processor executes instructions to:
determine entropy risk scores, context risk scores, and history risk scores for the potential secrets; and
obtain final risk scores for the potential secrets from the entropy risk scores, the context risk scores, and the history risk scores.

4. The code remediation system of claim 3, wherein to calculate the entropy risk scores, the at least one processor executes instructions to:
calculate entropy associated with each of the potential secrets.

5. The code remediation system of claim 4, wherein higher values of the entropies of the potential secrets are indicative of the true positives.

6. The code remediation system of claim 3, wherein to calculate the context risk scores, the at least one processor executes instructions to:
calculate the context risk scores based on a plurality of factors including factors specific to the application and factors specific to the programming code.

7. The code remediation system of claim 6, wherein to calculate the context risk scores, the at least one processor executes instructions to:
calculate the context risk scores as one of an average and a weighted average of component context scores of the plurality of factors.

8. The code remediation system of claim 3, wherein to calculate the history risk scores, the at least one processor executes instructions to:
identify one or more of the potential secrets that were previously marked as false positives in prior scans of the programming code.

9. The code remediation system of claim 3, wherein to filter out the false positives, the at least one processor is to:
compare the final risk scores to a predetermined risk threshold; and
disregard as the false positives one or more of the potential secrets with the final risk scores that do not meet the predetermined risk threshold.

10. The code remediation system of claim 1, wherein the access mechanisms include Universal Resource Locators (URLs) with parameters that enable authenticated entities to access the true positives stored in the vault upon execution of the modified programming code by the application.

11. The code remediation system of claim 10, wherein the application accesses a database, the true positives include authentication credentials to the database and the parameters include a timer function associated with keeping the authentication credentials valid for a time period.

12. A method of remediating programming code, comprising:
accessing programming code of an application and information regarding potential secrets included in the programming code;
calculating a final risk score for each of the potential secrets,
wherein the final risk score is indicative of a corresponding potential secret being a false positive or a true positive;

identifying the false positives and the true positives from the potential secrets based at least on the final risk scores of the potential secrets;

filtering out the false positives of the potential secrets from further processing;

storing a subset of the potential secrets determined to be the true positives in corresponding storage locations of a vault; and generating modified programming code by replacing the true positives in the programming code with corresponding access mechanisms to the storage locations on the vault storing the true positives.

13. The method of programming code remediation of claim 12, further comprising:

providing the modified programming code for execution to the application.

14. The method of remediating the programming code of claim 12, wherein calculating the final risk scores further comprises:

determining entropy risk scores, context risk scores, and a history coefficient for each of the potential secrets; and obtaining final risk scores for the potential secrets from the entropy risk scores, the context risk scores, and the history risk scores.

15. The method of remediating the programming code of claim 14, wherein determining the entropy risk scores further comprises:

calculating entropy of each of the potential secrets with one of Shannon's entropy and Guessing Entropy.

16. The method of remediating the programming code of claim 14, wherein determining the history coefficient further comprises:

comparing a current secret detection scan report with one or more previous secret detection scan reports;

identify one or more of the potential secrets in the current secret detection scan report that were marked as false positives in at least one of the previous secret detection scan reports; and filtering out as the false positives one or more of the potential secrets in the current secret detection scan report that were marked as false positives in at least one of the previous secret detection scan reports.

17. The method of remediating the programming code of claim 13, wherein to filter out the false positives of the potential secrets, the at least one processor executes instructions to:

determine Receiver Operating Characteristics (ROC) for differentiating the false positives from the true positives.

18. A non-transitory processor-readable storage medium comprising machine-readable instructions that cause at least one processor to:

access modified programming code,
    wherein secrets in the modified programming code are replaced with access mechanisms to storage locations in a vault storing the secrets;

execute the modified programming code including executing the access mechanisms whenever the secrets are to be accessed;

access the storage locations in the vault via the execution of the access mechanisms;

retrieve the secrets from the storage locations; and continue with the execution of the modified programming code,
    wherein the modified programming code is obtained from a programming code upon filtering out false positives from potential secrets included in the programming code.

19. The non-transitory processor-readable storage medium of claim 18, wherein continuing with the execution of the modified programming code includes further instructions that cause the at least one processor to:

accessing the storage locations on the vault by executing the access mechanisms that include URLs to the storage locations; and retrieving at least one of the secrets including authentication credentials to a database.

20. The non-transitory processor-readable storage medium of claim 19, wherein continuing with the execution of the modified programming code includes further instructions that cause the at least one processor to:

connect to the database using the authentication credentials which are valid for a time period based on a parameter of one of the URLs used to access the at least one secret.

* * * * *